(12) United States Patent
Nakamura

(10) Patent No.: US 7,983,525 B2
(45) Date of Patent: Jul. 19, 2011

(54) RECORDING APPARATUS AND METHOD AND PROGRAM

(75) Inventor: Yoshio Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1356 days.

(21) Appl. No.: 11/469,657

(22) Filed: Sep. 1, 2006

(65) Prior Publication Data

US 2007/0077021 A1 Apr. 5, 2007

(30) Foreign Application Priority Data

Sep. 8, 2005 (JP) ................................ 2005-260311

(51) Int. Cl.
| H04N 5/765 | (2006.01) |
| H04N 5/89 | (2006.01) |
| H04N 5/93 | (2006.01) |
| H04N 5/931 | (2006.01) |
| H04N 5/932 | (2006.01) |

(52) U.S. Cl. ........ 386/232; 386/335; 386/284; 386/229; 386/204; 386/203; 386/207; 386/201; 386/208; 348/521; 348/441; 348/553; 348/445

(58) Field of Classification Search .................... 386/93, 386/35, 46, 96, 109, 112, 123–124, 131, 386/232, 284, 335, 229, 204, 203, 201, 207, 386/208; 725/39, 47, 58; 348/553, 500, 348/521, 536, 441, 445, 448

See application file for complete search history.

(56) References Cited

U.S. PATENT DOCUMENTS

| 5,221,863 A * | 6/1993 | Motegi ........................... 327/157 |
| 5,432,481 A * | 7/1995 | Saito ............................... 331/45 |
| 6,130,708 A * | 10/2000 | Kitagawa et al. ............. 348/184 |
| 6,618,095 B1 * | 9/2003 | Takeuchi et al. .............. 348/476 |
| 6,700,624 B2 * | 3/2004 | Yun ................................ 348/555 |
| 7,502,543 B2 * | 3/2009 | Kato .............................. 386/46 |
| 2004/0104755 A1 * | 6/2004 | Suzuki .......................... 327/300 |
| 2005/0111832 A1 * | 5/2005 | Okauchi et al. ................ 386/95 |
| 2005/0117583 A1 * | 6/2005 | Uchida et al. .............. 370/395.4 |
| 2005/0231638 A1 * | 10/2005 | Esaki ............................ 348/511 |
| 2007/0077021 A1 * | 4/2007 | Nakamura ....................... 386/46 |
| 2009/0041349 A1 * | 2/2009 | Suzuki et al. ................. 382/168 |

FOREIGN PATENT DOCUMENTS

| JP | 05-22695 | 1/1993 |
| JP | 05-75971 | 3/1993 |
| JP | 05-76049 | 3/1993 |
| JP | 07-67079 | 3/1995 |
| JP | 2001-275084 | 10/2001 |
| JP | 2003-008992 | 1/2003 |
| JP | 2003-299039 | 10/2003 |

* cited by examiner

*Primary Examiner* — Helen Shibru

(74) *Attorney, Agent, or Firm* — Oblon, Spivak, McClelland, Maier & Neustadt, L.L.P.

(57) ABSTRACT

A recording apparatus includes a synchronization-signal generator configured to generate a predetermined synchronization signal on the basis of a reference synchronization signal; a resolution converter configured to convert a second signal into a third signal when a received signal is the second signal, the second signal being different from a first signal having a first resolution and the second signal having a second resolution lower than the first resolution, and the third signal having the first resolution; a delayer configured to delay the first signal received when the received signal is the first signal, by a predetermined time taken to convert the second signal into the third signal; and a recorder configured to record the first signal delayed by the delayer or the third signal obtained by converting the second signal by the resolution converter, on a recording medium on the basis of the synchronization signal.

7 Claims, 12 Drawing Sheets

RECORDING APPARATUS AND METHOD AND PROGRAM

CROSS REFERENCES TO RELATED APPLICATIONS

The present invention contains subject matter related to Japanese Patent Application JP 2005-260311 filed in the Japanese Patent Office on Sep. 8, 2005, the entire contents of which are incorporated herein by reference.

BACKGROUND OF THE INVENTION

1. Field of the Invention

The present invention relates to recording apparatuses and methods and programs. More specifically, the present invention relates to a recording apparatus and method and program for facilitating management of time information in a recording apparatus.

2. Description of the Related Art

SDI (Serial Digital Interface) signals can be classified, for example, on the basis of resolution, as SD (Standard Definition) signals that have been used for many years and HD (High Definition) signals having a resolution higher than that of SD signals. As a type of editing system for editing SDI signals, a device for upconverting SD signals into HD signals or downconverting HD signals into SD signals exists. Such a device is disclosed, for example, in Japanese Unexamined Patent Application Publication No. 2003-299039.

SUMMARY OF THE INVENTION

In a recording apparatus that records input SDI signals as HD signals, when the input SDI signals are SD signals, a certain time is taken to upconvert the SD signals compared with a case where input HD signals are recorded directly. Thus, time information managed in the recording apparatus, such as time codes, is managed considering distinction between a case where SD signals are input and a case where HD signals are input, for example, by giving an offset.

It is desired that management of time information in a recording apparatus be facilitated.

According to an embodiment of the present invention, there is provided a recording apparatus including a synchronization-signal generator configured to generate a predetermined synchronization signal on the basis of a reference synchronization signal; a resolution converter configured to convert a second signal into a third signal when a received signal is the second signal, the second signal being different from a first signal having a first resolution and the second signal having a second resolution that is lower than the first resolution, and the third signal having the first resolution; a delayer configured to delay the first signal received when the received signal is the first signal, by a predetermined time that is taken to convert the second signal into the third signal having the first resolution; and a recorder configured to record the first signal having the first resolution and delayed by the delayer or the third signal having the first resolution and obtained by converting the second signal by the resolution converter, on a recording medium on the basis of the synchronization signal.

The recording apparatus may further include a first video-signal receiver configured to receive the first signal; a second video-signal receiver configured to receive the second signal; a classifier configured to classify whether the first signal or the second signal has been received; and a reference-synchronization-signal generator configured to generate the reference synchronization signal from the first signal or the second signal received.

Alternatively, the recording apparatus may further include a first video-signal receiver configured to receive the first signal; a second video-signal receiver configured to receive the second signal; a setter configured to set whether the first signal or the second signal is received; and a reference-synchronization-signal extractor configured to extract the reference synchronization signal from the first signal or the second signal received.

Alternatively, the recording apparatus may further include a video-signal receiver configured to receive the first signal or the second signal; a control-signal receiver configured to receive a control signal indicating whether the first signal or the second signal is received by the video-signal receiver; and a reference-synchronization-signal generator configured to generate the reference synchronization signal.

Alternatively, the recording apparatus may further include a video-signal receiver configured to receive the first signal or the second signal; a control-signal receiver configured to receive a control signal indicating whether the first signal or the second signal is received by the video-signal receiver; and a reference-synchronization-signal receiver configured to receive the reference synchronization signal.

The video-signal receiver may receive the first signal and the second signal continuously, and the recorder may record the first signal and the third signal as a single file on the recording medium.

When the third signal is recorded on the recording medium, the recorder may also record information indicating that the third signal has a converted resolution on the recording medium.

Also, the recorder may also record information regarding a point of change from the first signal to the third signal or a point of change from the third signal to the first signal on the recording medium.

According to another embodiment of the present invention, there is provided a recording method including the steps of generating a predetermined synchronization signal on the basis of a reference synchronization signal; converting a second signal into a third signal when a received signal is the second signal, the second signal being different from a first signal having a first resolution and the second signal having a second resolution that is lower than the first resolution, and the third signal having the first resolution; delaying the first signal received when the received signal is the first signal, by a predetermined time that is taken to convert the second signal into the third signal having the first resolution; and recording the delayed first signal having the first resolution or the third signal having the first resolution and obtained by converting the second signal, on a recording medium on the basis of the synchronization signal.

According to another embodiment of the present invention, there is provided a program for allowing a computer to execute processing including the steps of generating a predetermined synchronization signal on the basis of a reference synchronization signal; converting a second signal into a third signal when a received signal is the second signal, the second signal being different from a first signal having a first resolution and the second signal having a second resolution that is lower than the first resolution, and the third signal having the first resolution; delaying the first signal received when the received signal is the first signal, by a predetermined time that is taken to convert the second signal into the third signal having the first resolution; and recording the delayed first signal having the first resolution or the third signal having the first resolution and obtained by converting the second signal, on a recording medium on the basis of the synchronization signal.

According to these embodiments of the present invention, a predetermined synchronization signal is generated on the basis of a reference synchronization signal; a second signal is converted into a third signal when a received signal is the second signal, the second signal being different from a first signal having a first resolution and the second signal having a second resolution that is lower than the first resolution, and the third signal having the first resolution; the first signal received is delayed when the received signal is the first signal, by a predetermined time that is taken to convert the second signal into the third signal having the first resolution; and the delayed first signal having the first resolution or the third signal having the first resolution and obtained by converting the second signal is recorded on a recording medium on the basis of the synchronization signal.

The recording apparatus may be an independent apparatus, or a block that executes a recording process in a recording and playback apparatus.

According to these embodiments of the present invention, time management in a recording apparatus can be facilitated.

DESCRIPTION OF THE PREFERRED EMBODIMENTS

Figure 1:
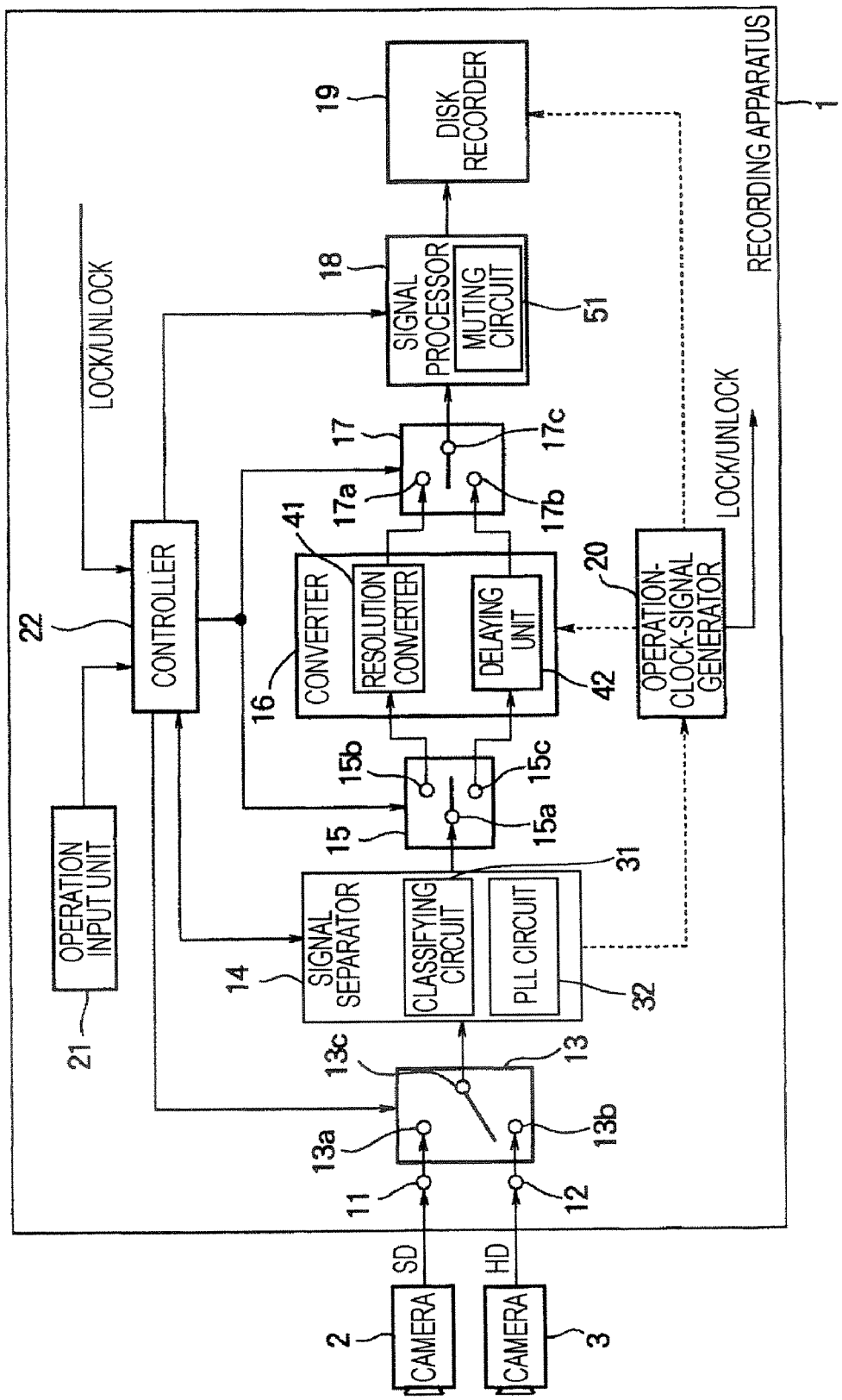
FIG. 1 is a block diagram showing the configuration of a recording apparatus according to a first embodiment of the present invention.

Before describing embodiments of the present invention, examples of correspondence between the features of the present invention and embodiments described in the specification will be described below. This description is intended to assure that embodiments supporting the present invention are described in this specification. Thus, even if a certain embodiment is not described herein as corresponding to certain features of the present invention, that does not necessarily mean that the embodiment does not correspond to those features. Conversely, even if an embodiment is described herein as corresponding to certain features, that does not necessarily mean that the embodiment does not correspond to other features.

A recording apparatus (e.g., a recording apparatus 1 shown in FIG. 1) according to an embodiment of the present invention includes a synchronization-signal generator (e.g., an operation-clock-signal generator 20 shown in FIG. 1) configured to generate a predetermined synchronization signal on the basis of a reference synchronization signal; a resolution converter (e.g., a resolution converter 41 shown in FIG. 1) configured to convert a second signal into a third signal when a received signal is the second signal, the second signal being different from a first signal having a first resolution and the second signal having a second resolution that is lower than the first resolution, and the third signal having the first resolution; a delayer (e.g., a delayer 42 shown in FIG. 1) configured to delay the first signal received when the received signal is the first signal, by a predetermined time that is taken to convert the second signal into the third signal having the first resolution; and a recorder (e.g., a disc recorder 19 shown in FIG. 1) configured to record the first signal having the first resolution and delayed by the delayer or the third signal having the first resolution and obtained by converting the second signal by the resolution converter, on a recording medium on the basis of the synchronization signal.

The recording apparatus may further include a first video-signal receiver (e.g., an external input terminal 12 shown in FIG. 1) configured to receive the first signal; a second video-signal receiver (e.g., an external input terminal 11 shown in FIG. 1) configured to receive the second signal; a classifier (e.g., a classifying circuit 31 shown in FIG. 1) configured to classify whether the first signal or the second signal has been received; and a reference-synchronization-signal generator (e.g., a PLL circuit 32 shown in FIG. 1) configured to generate the reference synchronization signal from the first signal or the second signal received.

Figure 7:
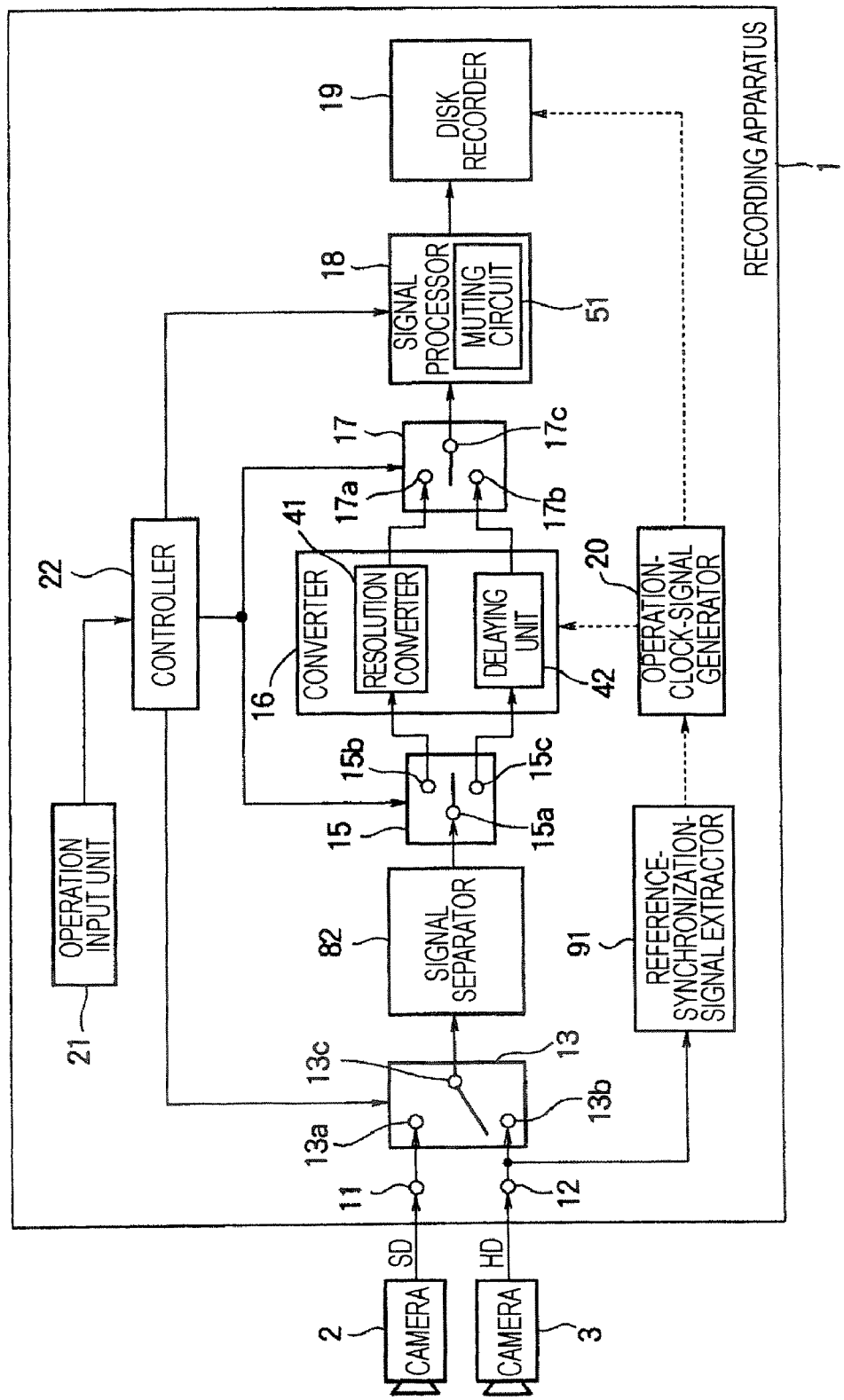
FIG. 7 is a block diagram showing the configuration of a recording apparatus according to a second embodiment of the present invention.

Alternatively, the recording apparatus may further include a first video-signal receiver (e.g., an external input terminal 12 shown in FIG. 7) configured to receive the first signal; a second video-signal receiver (e.g., an external input terminal 11 shown in FIG. 7) configured to receive the second signal; a setter (e.g., an operation input unit 21 shown in FIG. 7) configured to set whether the first signal or the second signal is received; and a reference-synchronization-signal extractor (e.g., a reference-synchronization-signal extractor 91 shown in FIG. 7) configured to extract the reference synchronization signal from the first signal or the second signal received.

Figure 8:
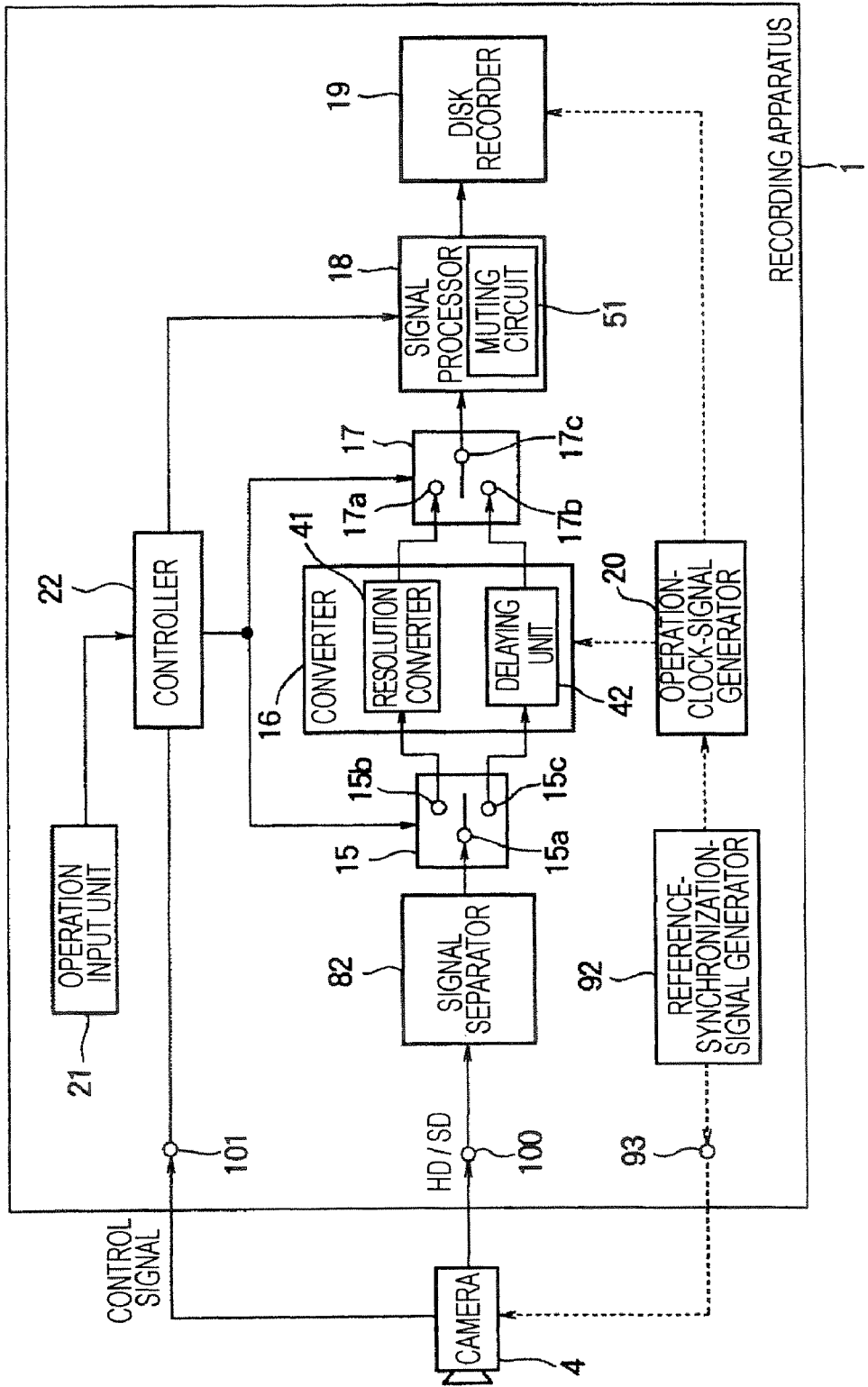
FIG. 8 is a block diagram showing the configuration of a recording apparatus according to a third embodiment of the present invention.

Alternatively, the recording apparatus may further include a video-signal receiver (e.g., an external input terminal 100 shown in FIG. 8) configured to receive the first signal or the second signal; a control-signal receiver (e.g., an external input terminal 101 shown in FIG. 8) configured to receive a control signal indicating whether the first signal or the second signal is received by the video-signal receiver; and a reference-synchronization-signal generator (e.g., a reference-synchronization-signal generator 92 shown in FIG. 8) configured to generate the reference synchronization signal.

Alternatively, the recording apparatus may further include a video-signal receiver (e.g., an external input terminal 100 shown in FIG. 9) configured to receive the first signal or the second signal; a control-signal receiver (e.g., an external input terminal 101 shown in FIG. 9) configured to receive a control signal indicating whether the first signal or the second signal is received by the video-signal receiver; and a reference-synchronization-signal receiver (e.g., an external input terminal 102 shown in FIG. 9) configured to receive the reference synchronization signal.

According to another embodiment of the present invention, there is provided a recording method or program including the steps of generating (e.g., step S15 shown in FIG. 4) a predetermined synchronization signal on the basis of a reference synchronization signal; converting (e.g., step S31 shown in FIG. 5) a second signal into a third signal when a received signal is the second signal, the second signal being different from a first signal having a first resolution and the second signal having a second resolution that is lower than the first resolution, and the third signal having the first resolution; delaying (e.g., step S51 shown in FIG. 6) the first signal received when the received signal is the first signal, by a predetermined time that is taken to convert the second signal into the third signal having the first resolution; and recording (e.g., step S53 shown in FIG. 6) the delayed first signal having the first resolution or the third signal having the first resolution and obtained by converting the second signal, on a recording medium on the basis of the synchronization signal.

Now, embodiments of the present invention will be described with reference to the drawings.

FIG. 1 shows the configuration of a recording apparatus according to a first embodiment of the present invention.

Referring to FIG. 1, a recording apparatus 1 is connected individually to cameras 2 and 3 via SDI (Serial Digital Interface) cables (not shown). The SDI is a video-signal transmission standard and supports transmission of video signals, audio signals, and ANC signals.

The recording apparatus 1 upconverts SD (Standard Definition) signals output from the camera 2 into HD (High Definition) signals, and records the HD signals on a disc recording medium (not shown), for example, a professional disc on which data can be recorded at a high density by a blue-violet laser, an optical disc such as a DVD (Digital Versatile Disc), or a hard disc. Also, the recording apparatus 1 records HD signals output from the camera 3 on a disc recording medium. The recording apparatus 1 is not allowed to record HD signals obtained by upconverting input SD signals and input HD signals simultaneously on a disc recording medium. Thus, a user selects either SD signals or HD signals so that the selected signals are input to the recording apparatus 1.

The SD signals herein are SDI signals having a number of pixels corresponding to 720 (vertical lines)×486 (horizontal lines) effective scanning lines according to the NTSC (National Television System Committee) standard or 720 (vertical lines)×576 (horizontal lines) effective scanning lines according to the PAL (Phase Alternation by Line) standard. The HD signals herein are SDI signals having a number of pixels corresponding to 1920 (vertical lines)×1080 (horizontal lines), 1440 (vertical lines)×1080 (horizontal lines), or 1280 (vertical lines)×720 (horizontal lines) effective scanning lines, i.e., SDI signals having a resolution higher than the resolution of the SD signals. The SDI signals include audio data.

The camera 2 is connected to an external input terminal 11 of the recording apparatus 1, and the camera 2 outputs SD signals obtained by imaging to the recording apparatus 1. The camera 3 is connected to an external input terminal 12 of the recording apparatus 1, and the camera 3 outputs HD signals obtained by imaging to the recording apparatus 1.

The external input terminal 11 receives the SD signals from the camera 2 and forwards the SD signals to a terminal 13a of a switch 13. The external input terminal 12 receives the HD signals from the camera 3 and forwards the HD signals to a terminal 13b of the switch 13.

The switch 13, under the control of a controller 22, switches SDI signals supplied to a signal separator 14 between the SD signals input to the terminal 13a and the HD signals input to the terminal 13b. More specifically, the SD signals from the camera 2 are supplied to the signal separator 14 when the terminal 13a is selected by the controller 22, while the HD signals from the camera 3 are supplied to the signal separator 14 when the terminal 13b is selected by the controller 22.

The signal separator 14 separates the input SDI signals (SD signals or HD signals) into video signals, audio signals, and ANC signals including time codes, and outputs these signals to a terminal 15a of a switch 15. The signal separator 14 includes a classifying circuit 31 and a PLL circuit 32.

The classifying circuit classifies the SDI signals supplied from the switch 13 into either HD signals or SD signals, and supplies a signal (control signal) indicating whether the input SDI signals are HD signals or SD signals to the controller 22. The classifying circuit 31 may supply the signal indicating HD signals or SD signals continuously while SDI signals are being input from the switch 13, or only at timings of switching between HD signals and HD signals, i.e., only at timings immediately after changes in the resolution of input SDI signals.

The PLL (Phase Locked Loop) circuit 32 generates a reference synchronization signal synchronized with a synchronization signal included in the input SDI signals (synchronization signals extracted from the SDI signals) according to an initialization instruction (control signal) supplied from the controller 22, and supplies the reference synchronization signal to an operation-clock-signal generator 20. More specifically, when the SDI signals are HD signals, the reference synchronization signal extracted from the SDI signals has a frequency of 74 MHz. When the SDI signals are SD signals, the reference synchronization signal extracted from the SDI signals has a frequency of 27 MHz. In the block diagram shown in FIG. 1, dotted lines represent synchronization signals, and solid lines represent SDI signals or control signals.

The switch 15 switches whether the SDI signals (separated into video signals, audio signals, and ANC signals) supplied from the signal separator 14 to the terminal 15a are to be output via a terminal 15a or a terminal 15c under the control of the controller 22. The controller 22 controls the switch 15 so that the terminal 15b is selected when SD signals are being input to the recording apparatus 1. On the other hand, the controller 22 controls the switch 15 so that the terminal 15c is selected when HD signals are being input to the recording apparatus 1.

Thus, when SD signals are supplied from the signal separator 14 to the switch 15, the SD signals are output to a resolution converter 41 of a converter 16. On the other hand, when HD signals are supplied from the signal separator 14 to the switch 15, the HD signals are output to a delayer of the converter 16.

The converter 16 includes the resolution converter 41 and the delayer 42. The resolution converter 41 receives input of SD signals output from the terminal 15b of the switch 15. The resolution converter 41 upconverts the input SD signals into HD signals (i.e., carries out resolution conversion), and outputs the HD signals to a terminal 17a of a switch 17. The delayer 42 receives HD signals from the terminal 15c of the switch 15. The delayer 42 delays the input HD signals for a predetermined time that it takes for the resolution converter 41 to upconvert SD signals into HD signals (e.g., a processing time for 0.5 to 1 frame of an image composed of HD signals), and outputs the delayed HD signals to a terminal 17b of the switch 17. Hereinafter, HD signals obtained by upconverting SD signals will be referred to as converted HD signals, as distinguished from SDI signals input in the form of HD signals from the beginning.

The switch 17 switches whether the SDI signals input to the terminal 17a or the SDI signals input to the terminal 17b are to be output to a signal processor 18 under the control of the controller 22. The controller 22 controls the switch 17 so that the terminal 17a is selected when SD signals are being input to the recording apparatus 1. On the other hand, the controller 22 controls the switch 17 so that the terminal 17b is selected when HD signals are being input to the recording apparatus 1.

The signal processor 18 encodes the SDI signals supplied from the switch 17 (HD signals or converted HD signals), for example, according to the MPEG (Moving Picture Experts Group) encoding scheme, and outputs the encoded SDI signals to a disc recorder 19. Furthermore, the signal processor 18 includes a muting circuit 51 so that video and sound not desired for recording, such as disturbed video that arises at the time of switching between HD signals and SD signals, can be muted (discarded) according to instructions from the controller 22. When SDI signals are recorded on a disc recording medium with the muting function of the muting circuit 51 turned on, when the SDI signals are played back, for example, the image played back is black over all the pixels and the sound played back is silence.

The disc recorder 19 records the (encoded) SDI signals (HD signals or converted HD signals) supplied from the signal processor 18 on a disc recording medium in the form of a clip (file). A clip herein refers to a unit corresponding to a single recording process from the start to end of recording of a set of SDI signals.

As will be described later with reference to FIG. 2, the operation-clock-signal generator 20 includes a PLL circuit. The operation-clock-signal generator 20 generates a synchronization signal synchronized with the phase of the reference synchronization signal supplied from the PLL circuit 32 of the signal separator 14, and supplies the synchronization signal to the converter 16 and the disc recorder 19. Each block in the recording apparatus 1 operates on the basis of the synchronization signal output from the operation-clock-signal generator 20. Hereinafter, the synchronization signal output from the operation-clock-signal generator 20 will be referred to as an operation clock signal. Furthermore, the operation-clock-signal generator 20 outputs the status as to whether the operation clock signal is stable, i.e., the locked/unlocked status of the operation clock signal, to the controller 22.

An operation input unit 21 includes a liquid-crystal display screen, an operation panel, and so forth. The operation input unit 21 accepts user's operations and supplies operation signals corresponding to the operations to the controller 22.

The controller 22 controls individual blocks according to signals including the operations signals from the operation input unit 21. For example, the controller 22 controls the switches 13, 15, and 17 according to signals indicating whether input SDI signals are SD signals or HD signals. Also, the controller 22 supplies control signals to the signal processor 18 at timings of switching of input SDI signals between SD signals and HD signals so that the muting function of the muting circuit 51 is turned on or off accordingly. Although some solid lines representing control signals between the controller 22 and blocks are omitted in FIG. 1, the blocks can exchange signals (control signals or data) with each other as needed.

In the recording apparatus 1 configured as described above, when SD signals are supplied from the camera 2, converted HD signals obtained by upconverting the SD signals are encoded and the encoded signals are recorded on a disc recording medium. When HD signals are supplied from the camera 3, the HD signals are encoded and the encoded signals are recorded on a disc recording medium.

Figure 2:
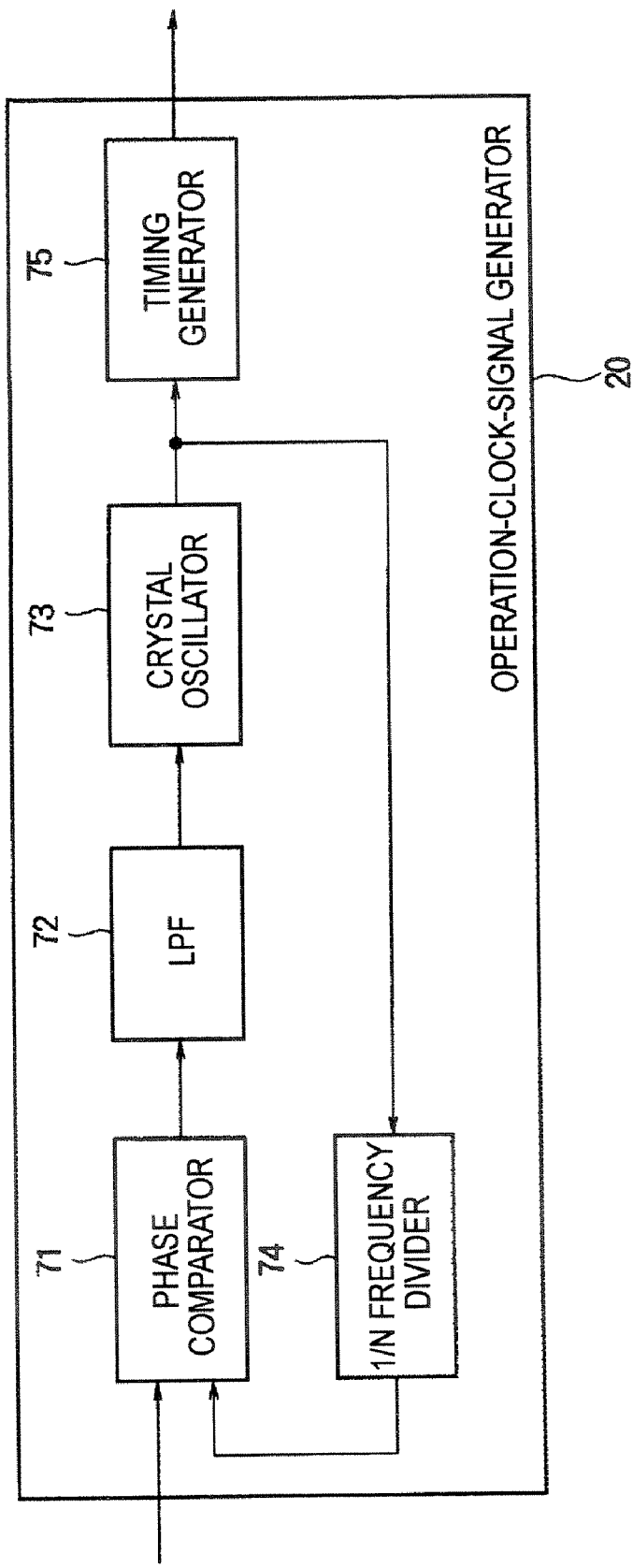
FIG. 2 is a block diagram showing in detail an example of the configuration of an operation-clock-signal generator shown in FIG. 1.

FIG. 2 shows in detail an example of the configuration of the operation-clock-signal generator 20 shown in FIG. 1.

The operation-clock-signal generator 20 includes a phase comparator 71, an LPF (Low Pass Filter) 72, a crystal oscillator 73, a 1/N frequency divider 74, and a timing generator 75.

The phase comparator 71 compares the phase of the reference synchronization signal (reference signal) supplied from the PLL circuit 32 of the signal separator 14 (FIG. 1) with the phase of a feedback signal (compared signal) supplied from the 1/N frequency divider 74, and supplies a resulting phase difference signal to the LPF 72.

The LPF 72 removes high-frequency components of the phase-difference signal, and supplies the result to the crystal oscillator 73. On the basis of the signal supplied from the LPF 72 (the phase-difference signal with the high-frequency components removed therefrom), the crystal oscillator 73 outputs a synchronization signal having a predetermined frequency (oscillation frequency). The synchronization signal output from the crystal oscillator 73 is supplied to the 1/N frequency divider 74 and the timing generator 75.

The 1/N frequency divider 74 supplies a feedback signal to the phase comparator 71. The feedback signal is obtained by 1/N frequency division of the synchronization signal having the oscillation frequency, supplied from the crystal oscillator 73, so that the feedback signal has the same frequency as the reference synchronization signal supplied from the PLL circuit 32.

Thus, the phase comparator 71, the LPF 72, the crystal oscillator 73, and the 1/N frequency divider 74 form a PLL circuit, which outputs to the timing generator 75 a synchronization signal synchronized with the reference synchronization signal supplied from the PLL circuit 32.

The timing generator 75 generates various operation clock signals, such as a clock signal for vertical components, a clock signal for horizontal components, and a clock signal for frame processing, using the synchronization signal supplied from the crystal oscillator 73, and supplies the operation clock signals to individual blocks of the recording apparatus 1.

The operation-clock-signal generator 20 configured as described above outputs operation clock signals synchronized with the reference synchronization signal supplied from the PLL circuit 32 of the signal separator 14.

Thus, if the reference synchronization signal supplied from the PLL circuit 32 of the signal separator 14, it is difficult for the operation-clock-signal generator 20 to output stable operation clock signals. Since the reference synchronization signal output from the PLL circuit 32 is generated on the basis of a synchronization signal extracted from input SDI signals, the stability of the SDI signals is desired for the stability of the reference synchronization signal.

To put it conversely, immediately after switching of the SDI signals input to the recording apparatus 1 from SD signals output from the camera 2 to HD signals output from the camera 3, it is difficult for the PLL circuit 32 to output a stable reference synchronization signal to the operation-clock-signal generator 20. Since it is difficult to obtain a stable reference synchronization signal, similarly, it is difficult for the operation-clock-signal generator 20 to output stable operation clock signals. Thus, immediately after switching of the resolution of input SDI signals, recording of SDI signals on a disc recording medium should be suspended (stopped) until stable operation clock signals are supplied to individual blocks of the recording apparatus 1.

Now, a process that is executed by the recording apparatus 1 shown in FIG. 1 when the resolution of SDI signals input to the recording apparatus 1 is switched (SDI-signal switching process) will be described with reference to FIG. 3.

Figure 3:
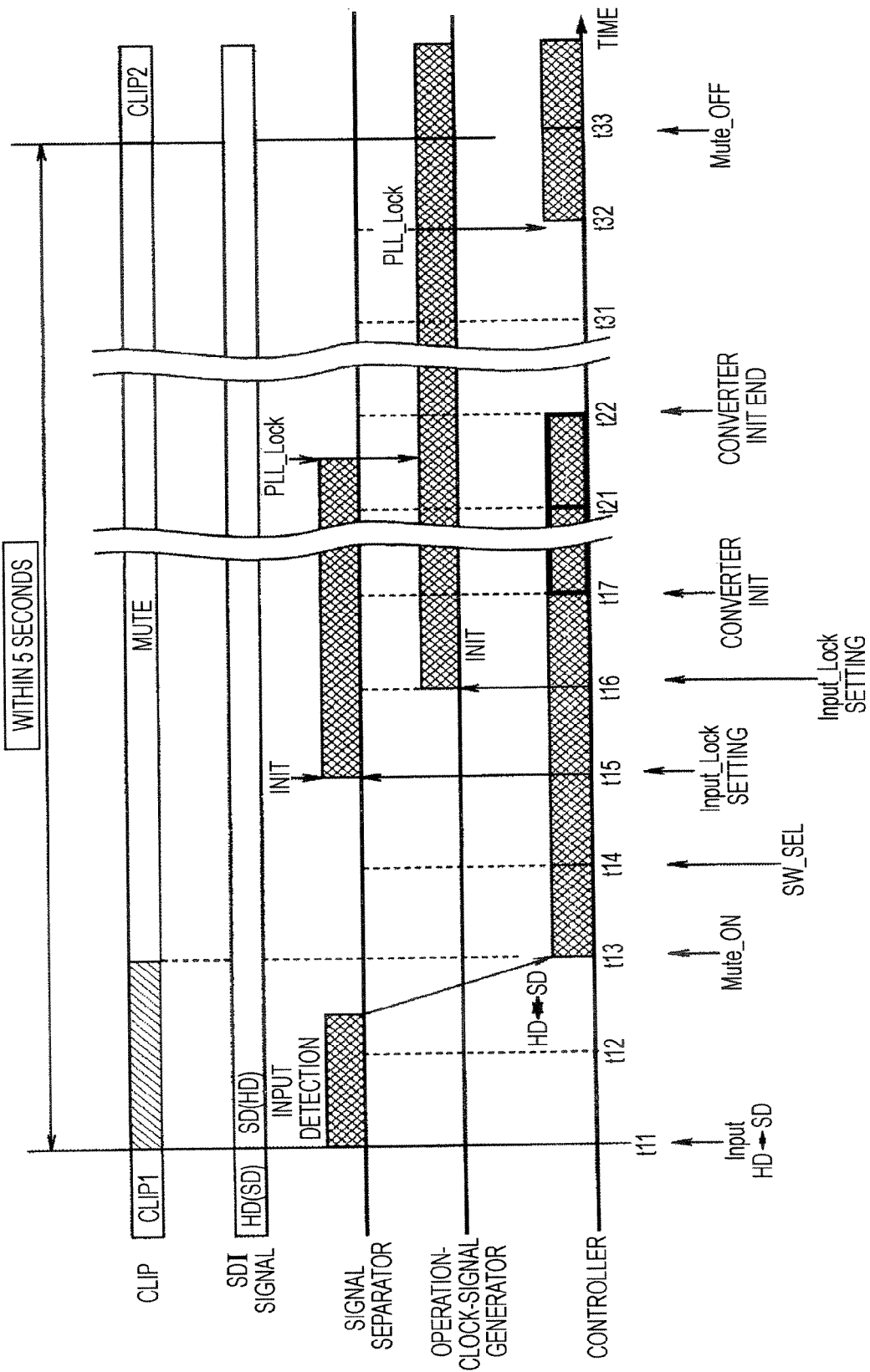
FIG. 3 is a timing chart for explaining processing executed by individual blocks of the recording apparatus shown in FIG. 1.

FIG. 3 is a timing chart for explaining processing executed by individual blocks of the recording apparatus 1 shown in FIG. 1.

As shown in FIG. 3, before time $t_{11}$, HD signals are input to the recording apparatus 1 and recorded as "Clip 1" on a disc recording medium. When the input SDI signals are switched from HD signals to SD signals at time $t_{11}$, between time $t_{11}$ and time $t_{13}$, the signal separator 14 (the classifying circuit 31 thereof) detects that the input SDI signals have been switched from HD signals to SD signals and notifies the controller 22 that SD signals have been input.

After time $t_{11}$, i.e., after the input HD signals have been switched from HD signals to SD signals, the reference synchronization signal extracted therefrom becomes temporarily unstable, so that the operation-clock-signal generator 20 also becomes unlocked. The controller 22 controls the disc recorder 19 on the basis of the unlocked-status information supplied from the operation-clock-signal generator 20, thereby quitting recording of SDI signals on the disc recording medium. That is, recording of HD signals as "Clip 1" on the disc recording medium is finished.

Then, when a signal indicating the input of SD signals has been supplied from the signal separator 14 to the controller 22, at time $t_{13}$, the controller 22 controls the signal processor 18 to turn on the muting function of the muting circuit 51. Then, at time $t_{14}$, the controller 22 sets the switches 13, 15, and 17 to the terminals on the sides associated with SD signals. That is, the controller 22 causes the switch 13, the switch 15, and the switch 17 to select the terminal 13a, the terminal 15b, and the terminal 17a, respectively.

At time $t_{15}$, the controller 22 instructs the signal separator 14 to synchronize the reference synchronization signal with the SD signals being input. Thus, the PLL circuit 32 of the signal separator 14 starts processing for synchronizing the reference synchronization signal to output with a synchronization signal included in the SD signals input.

At time $t_{16}$, the controller 22 also instructs the operation-clock-signal generator 20 to synchronize operation clock signals with the reference synchronization signal supplied from the PLL circuit 32 of the signal separator 14. Thus, the PLL circuit of the operation-clock-signal generator 20 (formed by the phase comparator 71, the LPF 72, the crystal oscillator 73, and the 1/N frequency divider 74) starts processing for synchronizing the operation clock signals to output with the reference synchronization signal.

At time $t_{17}$, the controller 22 supplies an initializing instruction to the converter 16. In response to the instruction, the converter 16 starts initialization at time $t_{17}$ and finishes initialization at time $t_{22}$.

Furthermore, between time $t_{21}$ and time $t_{22}$, the PLL circuit 32 of the signal separator 14 becomes locked, so that a stable reference synchronization signal starts to be supplied to the operation-clock-signal generator 20. From this point in time, the operation-clock-signal generator 20 substantially starts processing for synchronizing operation clock signals with the reference synchronization signal. Then, at time $t_{32}$, the operation clock signals become stable, so that the operation-clock-signal generator 20 becomes locked. Then, the locked-status information is supplied from the operation-clock-signal generator 20 to the controller 22. Then, at time $t_{33}$, the controller 22 turns off the muting function of the signal processor 18. Then, the recording of SDI signals on the disc recording medium is resumed, so that converted HD signals obtained by upconverting SD signals are newly recorded as "Clip 2" on the disc recording medium.

As described above, when the resolution of the input SDI signals is switched and the operation-clock-signal generator 20 becomes unlocked, the recording apparatus 1 once quits recording of a clip, and resumes recording on the disc recording medium when the operation-clock-signal generator 20 becomes locked.

As shown in FIG. 3, the time between the end of recording of the clip that has been under recording ("Clip 1") and the start of recording of the next clip ("Clip 2") is within five seconds.

Although the controller 22 outputs instructions at regular intervals (e.g., corresponding to the processing period for one frame) as indicated by dotted lines in FIG. 3 for simplicity of description, the controller 22 can output instructions at appropriate timings in accordance with responses from individual blocks.

Figure 4:
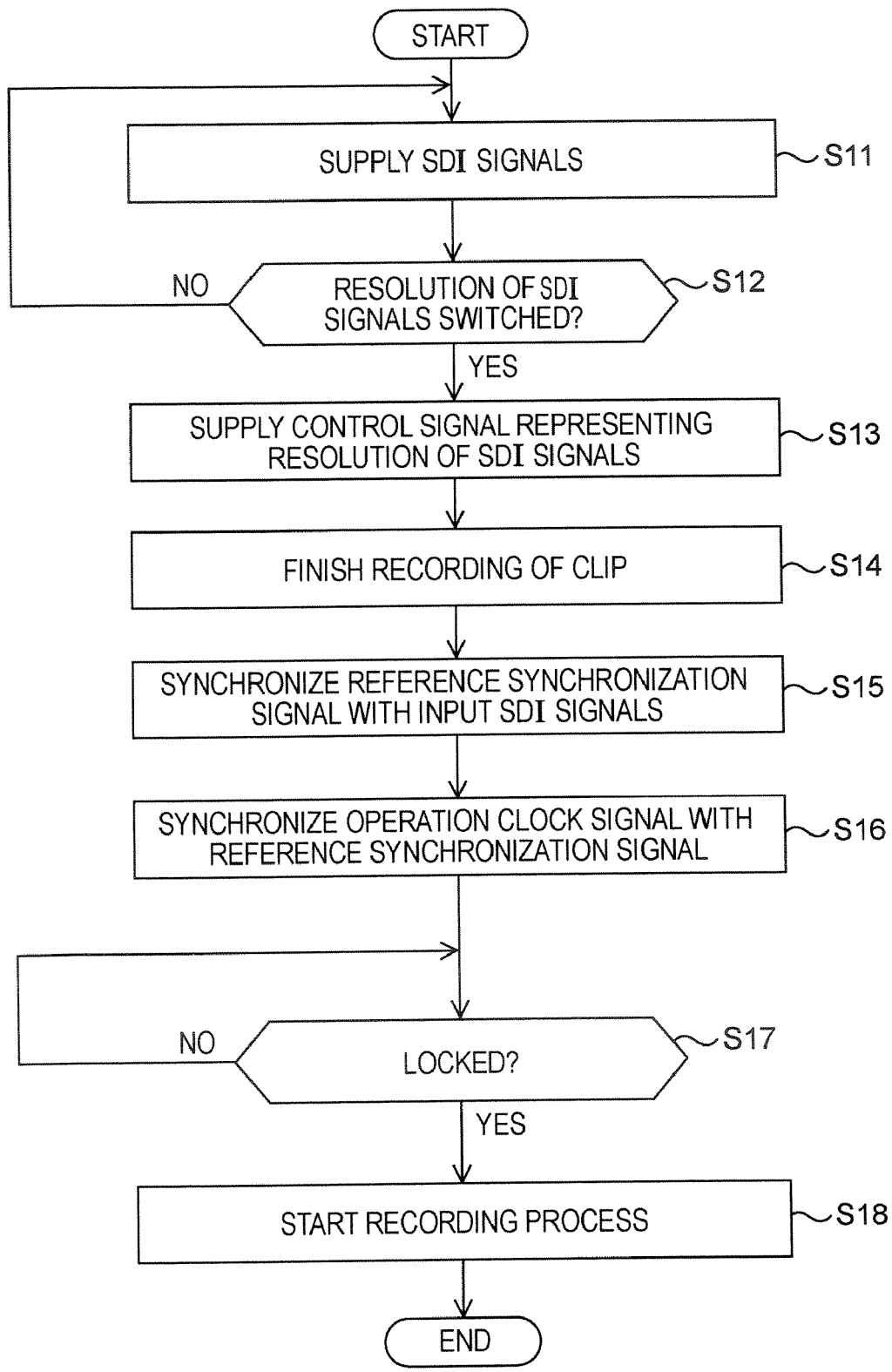
FIG. 4 is a flowchart of an SDI-signal switching process executed by the recording apparatus 1 shown in FIG. 1.

FIG. 4 is a flowchart of the SDI-signal switching process executed by the recording apparatus 1 shown in FIG. 1.

First, in step S11, the external input terminal 11 or 12 supplies SDI signals received from the camera 2 or 3 to the signal separator 14 via the switch 13. The switch 13 is set to the terminal 13a or 13b in accordance with the SDI signals currently being input (SD signals or HD signals).

In step S12, the classifying circuit 31 of the signal separator 14 classifies the input SDI signals as SD signals or HD signals, and determines whether the resolution of the SDI signals has been switched, i.e., whether the input SDI signals have been switched from SD signals to HD signals or HD signals to SD signals.

When it is determined in step S12 that the resolution of the SDI signals has not been switched, the process returns to step S11, and steps S11 and S12 are repeated. On the other hand, when it is determined in step S12 that the resolution of the SDI signals has been switched, the process proceeds to step S13.

In step S13, the classifying circuit 31 supplies a control signal representing the resolution of the SDI signals after the switching to the controller 22. That is, the classifying circuit 31 supplies to the controller 22 a control signal indicating input of HD signals when the input SDI signals have been switched from SD signals to HD signals, while supplying to the controller 22a control signal indicating input of SD signals when the input SDI signals have been switched from HD signals to SD signals.

In step S14, the controller 22 quits recording of SDI signals on the disc recording medium (finishes recording of a clip), on the basis of the unlocked-status information supplied from the operation-clock-signal generator 20. Furthermore, in step S14, the controller 22 turns on the muting function of the muting circuit 51 and initializes the converter 16. Furthermore, the controller 22 sets the terminals of the switches 13, 15, and 17 in accordance with the resolution of the SDI signals after the switching.

In step S15, the controller 22 instructs the signal separator 14 to synchronize the reference synchronization signal with the SDI signals being input. Then, the PLL circuit 32 starts processing for synchronizing the reference synchronization signal to output with a synchronization signal included in the input SDI signals.

In step S16, the operation-clock-signal generator 20 starts processing for synchronizing the operation clock signals to output with the reference synchronization signal.

In step S17, the controller 22 checks whether the operation clock signals have become locked (become stable), i.e., whether locked-status information has been supplied from the operation-clock-signal generator 20, and waits until it is determined that the operation clock signals have become locked.

When it is determined in step S17 that the operation clock signals have become locked, the process proceeds to step S18, and the controller 22 starts recording of the SDI signals being input. More specifically, in step S18, the controller 22 turns off the muting function of the signal processor 18 so that the SDI signals are supplied to the disc recorder 19, and causes the disc recorder 19 to start a recording process. The process is then exited.

Figure 5:
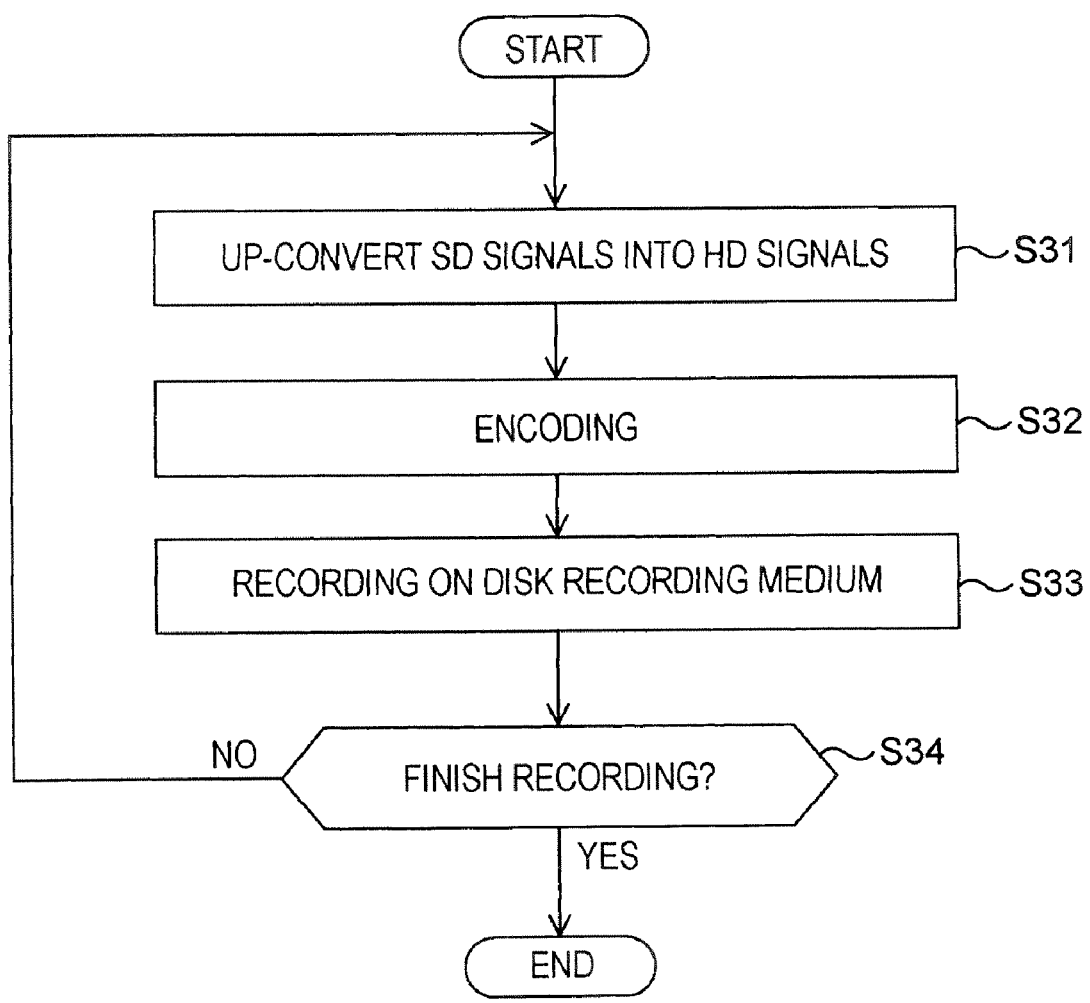
FIG. 5 is a flowchart of a recording process executed in a case where SD signals are input.

The recording process started in step S18 shown in FIG. 4 is executed according to a flowchart shown in FIG. 5. FIG. 5 shows a recording process that is executed when the SDI signals supplied to the recording apparatus 1 are SD signals.

First, in step S31, the resolution converter 41 upconverts SD signals supplied from the signal separator 14 via the switch 15 into HD signals. The process then proceeds to step S32.

In step S32, the signal processor 18 encodes the HD signals obtained by upconverting SD signals (converted HD signals), supplied from the resolution converter 41, for example, according to the MPEG encoding scheme. The process then proceeds to step S33.

In step S33, the disc recorder 19 records the converted HD signals supplied from the signal processor 18 on a disc recording medium. The process then proceeds to step S34.

In step S34, it is checked whether the recording is to be finished. It is determined that the recording is to be finished, for example, when the operation-clock-signal generator 20 has become unlocked (i.e., when the supply of SD signals from the camera 2 has been stopped or when the SDI signals input to the signal separator 14 have been switched from SD signals to HD signals), or when the user has performed an operation for finishing recording via the operation input unit 21. When it is determined in step S34 that the recording is not to be finished, the process returns to step S31, and steps S31 to S34 are repeated.

On the other hand, when it is determined in step S34 that the recording is to be finished, the recording process is exited.

Figure 6:
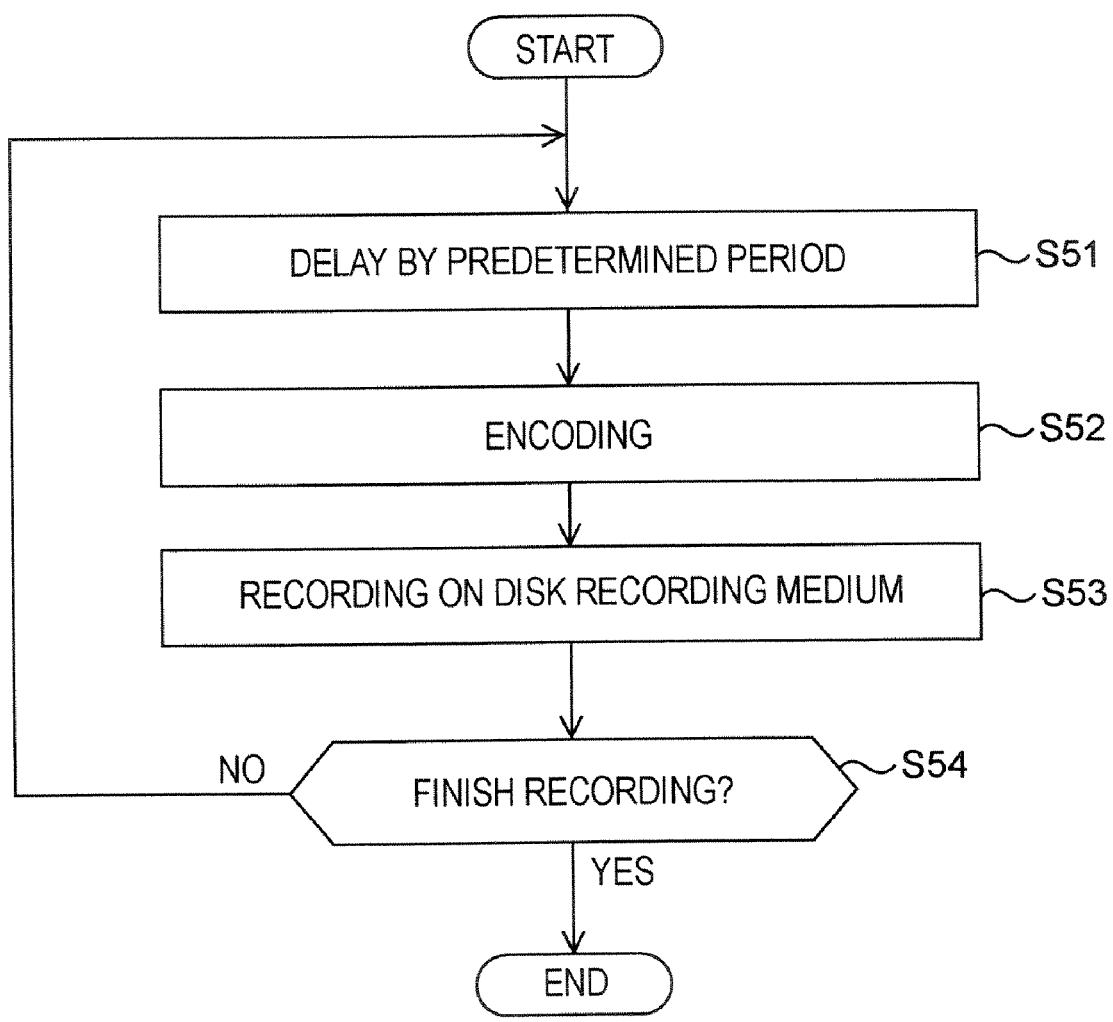
FIG. 6 is a flowchart of a recording process executed when HD signals are input.

Next, a recording process that is executed when the SDI signals supplied to the recording apparatus 1 are HD signals will be described with reference to a flowchart shown in FIG. 6.

First, in step S51, the delayer 42 delays HD signals supplied from the signal separator 14 via the switch 15 by a predetermined time that it takes for the resolution converter 41 to convert SD signals into HD signals. The process then proceeds to step S52.

In step S52, the signal processor 18 encodes the HD signals supplied from the delayer 42, for example, according to the MPEG encoding scheme. The process then proceeds to step S53.

In step S53, the disc recorder 19 records the HD signals supplied from the signal processor 18 on a disc recording medium. The process then proceeds to step S54.

In step S54, it is checked whether the recording is to be finished. It is determined that the recording is to be finished, for example, when the operation-clock-signal generator 20 has become unlocked (i.e., when the supply of HD signals from the camera 3 has been stopped or when the SDI signals input to the signal separator 14 have been switched from HD signals to SD signals), or when the user has performed an operation for finishing recording via the operation input unit 21. When it is determined in step S54 that the recording is not to be finished, the process returns to step S51, and steps S51 to S54 are repeated.

On the other hand, when it is determined in step S54 that the recording is to be finished, the recording process is exited.

As described above, HD signals are SD signals are input to the recording apparatus 1 from the camera 2 or the camera 3. The signal separator 14 (the classifying circuit 31 thereof) classifies the input SDI signals as SD signals or HD signals. When the input SDI signals are SD signals, the resolution converter 41 upconverts the SD signals into HD signals. When the input SDI signals are HD signals, the delayer 42 delays the input HD signals by a predetermined time that it takes for the resolution converter 41 to upconvert SD signals into HD signals. Then, the disc recorder 19 records HD signals or converted HD signals that have been encoded on a disc recording medium on the basis of operation clock signals.

Since the delayer 42 delays the input HD signals by a predetermined time that it takes for the resolution converter 41 to upconvert SD signals into HD signals, the time between input to the recording apparatus 1 and recording on the disc recording medium is the same between the case where SD signals are input and the case where HD signals are input. Thus, the controller 22 can manage time information (time axis) in the recording apparatus 1 in an integrated manner, so that management (control) of time information is facilitated.

Furthermore, when switching between HD signals and SD signals occur, since these two types of signals have the same phase, the switching can take place without disturbing even a single frame (or field) of image. Furthermore, when the switching takes place instantaneously, the switching can be achieved without inserting muted SDI signals (black picture).

In the first embodiment described above, the recording apparatus 1 itself classifies whether the input SDI signals are SD signals or HD signals on the basis of the input SDI signals themselves, and generates operation clock signals for executing a recording process from a synchronization signal included in the input SDI signals (i.e., achieves synchronization). Thus, advantageously, it is possible to make decisions and execute processing within the recording apparatus 1 on the basis of the input SDI signals and to record the SDI signals on a disc recording medium. At the same time, however, disadvantageously, since it takes time to classify the input SDI signals and the reference synchronization signal differs between HD signals and SD signals, it takes a certain time before stable operation signals are obtained after switching of the SDI signals.

In view of the above, an example of the configuration of the recording apparatus 1 in which recording of SDI signals can be resumed instantaneously even when input SDI signals are switched, i.e., in which interruption of recording of clips on a disc recording medium can be avoided, will be described with reference to FIG. 7.

FIG. 7 shows the configuration of a recording apparatus according to a second embodiment of the present invention. In the recording apparatus 1 shown in FIG. 7, parts corresponding to those in FIG. 1 are designated by the same numerals, and description thereof will be omitted as appropriate.

The recording apparatus 1 shown in FIG. 7 differs from the recording apparatus 1 shown in FIG. 1 in that a signal separator 82 is provided instead of the signal separator 14 and in that a reference-synchronization-signal extractor 91 is newly provided. The recording apparatus 1 shown in FIG. 7 is configured otherwise the same as the recording apparatus 1 shown in FIG. 1.

The signal separator 82 does not include the classifying circuit 31 and the PLL circuit 32, but otherwise executes processing similarly to the signal separator 14 shown in FIG. 1. That is, the signal separator 82 separates input SDI signals into video signals, audio signals, and ANC signals, and outputs these signals to the terminal 15a of the switch 15.

The reference-synchronization-signal extractor 91 extracts a reference synchronization signal having a predetermined frequency from the input SDI signals, and outputs the reference synchronization signal to the operation-clock-signal generator 20. In the configuration shown in FIG. 7, HD signals input to the external input terminal 12 are constantly supplied to the reference-synchronization-signal extractor 91, so that the frequency of the reference synchronization signal output from the reference-synchronization-signal extractor 91 is 74 MHz, which is the same as the frequency of the reference synchronization signal extracted from HD signals by the PLL circuit 32 described earlier. Alternatively, the configuration may be such that SD signals input to the external input terminal 11 are constantly supplied to the reference-synchronization-signal extractor 91. In that case, the frequency of the reference synchronization signal output from the reference-synchronization-signal extractor 91 is 27 MHz.

Furthermore, in the recording apparatus 1 shown in FIG. 7, the user sets via the operation input unit 21 whether the SDI signals input to the recording apparatus 1 are HD signals or SD signals. The operation input unit 21 supplies an operation signal indicating HD signals or SD signals to the controller 22 according to a user's operation.

Thus, in the recording apparatus 1 shown in FIG. 7, the time taken for classifying the input SDI signals is substantially zero, and a reference synchronization signal having a predetermined frequency is constantly supplied to the operation-clock-signal generator 20. Accordingly, the operation-clock-signal generator 20 does not become unlocked at the timing of switching of the input SDI signals, so that recording on a disc recording medium is not interrupted even when the SDI signals are switched. That is, SDI signals can be recorded on a disc recording medium without causing interruptions at the timings of switching between HD signals and SD signals.

Figure 9:
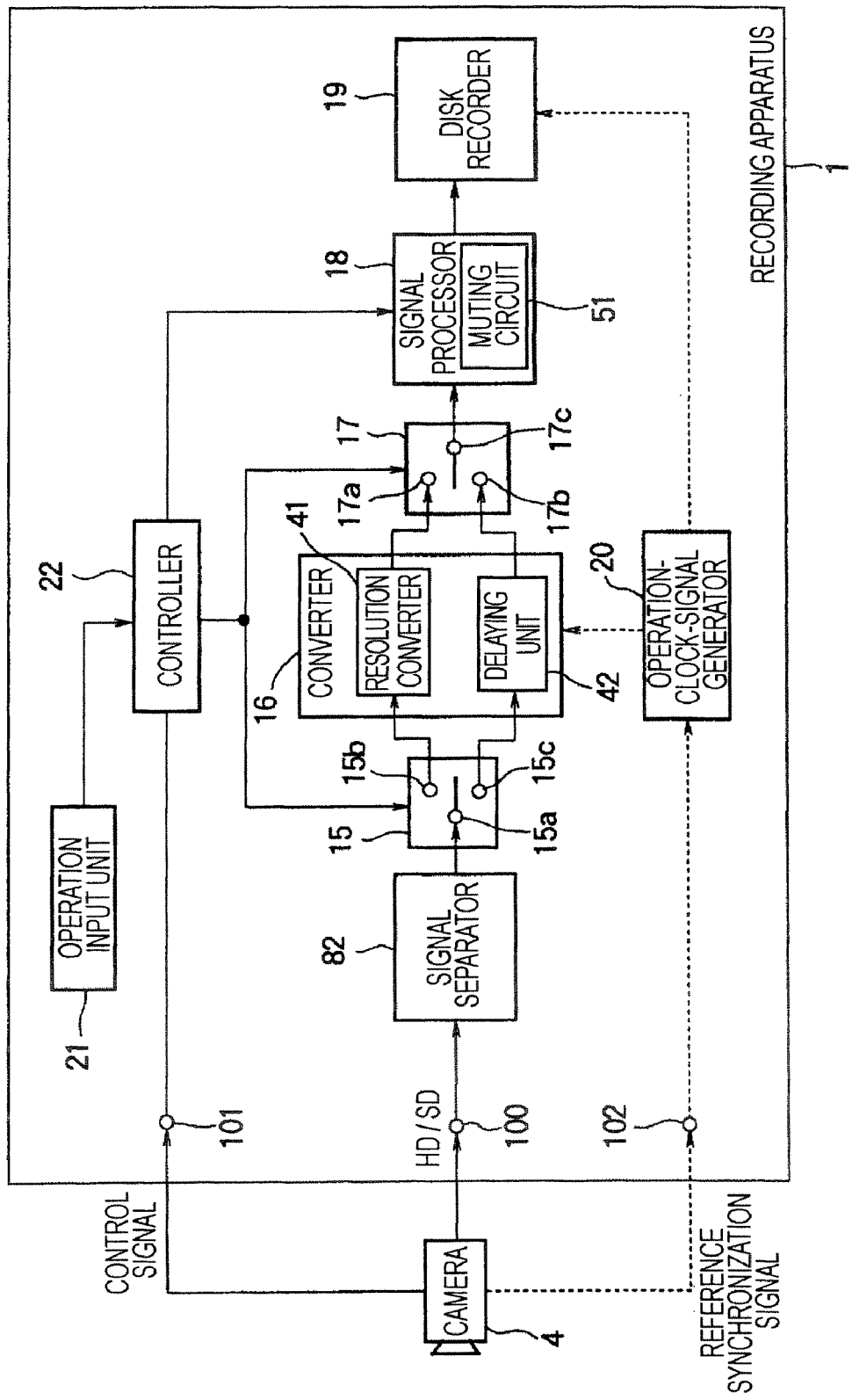
FIG. 9 is a block diagram showing the configuration of a recording apparatus according to a fourth embodiment of the present invention.

FIGS. 8 and 9 show the configurations of recording apparatuses according to third and fourth embodiments of the present invention. In FIGS. 8 and 9, parts corresponding to those in FIG. 7 are designated by the same numerals, and description thereof will be omitted as appropriate.

The recording apparatus 1 shown in FIG. 8 differs from the recording apparatus 1 shown in FIG. 7 in that a reference-synchronization-signal generator 92 is provided instead of the reference-synchronization-signal extractor 91, in that an external output terminal for outputting a reference synchronization signal generated by the reference-synchronization-signal generator 92 is newly provided, in that an external input terminal 100 that allows input of both SD signals and HD signals is provided instead of the external input terminals 11 and 12 respectively for inputting SD signals and HD signals and the switch 13 for selecting signals from the external input terminal 11 or 12, and in that an external input terminal 101 for inputting a signal indicating whether SDI signals input to the recording apparatus 1 are SD signals or HD signals is newly provided. The recording apparatus 1 shown in FIG. 8 is configured otherwise the same as the recording apparatus 1 shown in FIG. 7. The external input terminal 101 may be, for example, an RS-232C interface.

In the configuration shown in FIG. 8, instead of the cameras 2 and 3 shown in FIG. 7, a camera 4 outputs SDI signals (HD signals or SD signals) to the recording apparatus 1. The camera 4 may be, for example, an endoscope camera. In that case, by exchanging lenses that are set inside the endoscope camera, either HD signals or SD signals can be output. Furthermore, the camera 4 outputs HD signals or SD signals via the external output terminal 93 in synchronization with the reference synchronization signal supplied from the reference-synchronization-signal generator 92. Furthermore, the camera 4 detects the type of a lens that is set inside, using a sensor or the like, and outputs to the external input terminal 101 a signal indicating whether the SDI signals output from the camera 4 are HD signals or SD signals.

Regardless of whether the SDI signals input from the camera 4 to the recording apparatus 1 are HD signals or SD signals, the reference-synchronization-signal generator 92 generates a reference synchronization signal having a predetermined frequency, and supplies the reference synchronization signal to the operation-clock-signal generator 20 and the external output terminal 93. The external output terminal 93 outputs the reference synchronization to the camera 4.

The external input terminal 100 receives SD signals or HD signals supplied from the camera 4, and supplies the SD signals or HD signals to the signal separator 14. The external input terminal 101 receives from the camera 4 a signal indicating whether the SDI signals input to the external input terminal 100 are SD signals or HD signals. The external input terminal 101 receives the signal and supplies the signal to the controller 22.

Thus, also in the recording apparatus 1 shown in FIG. 8, the time taken for classifying the input SDI signals is substantially zero, and a reference synchronization signal having a predetermined frequency is constantly supplied to the operation-clock-signal generator 20. Accordingly, the operation-clock-signal generator 20 does not become unlocked at the timing of switching of the input SDI signals, so that recording on a disc recording medium is not interrupted even when the SDI signals are switched. That is, SDI signals can be recorded on a disc recording medium without causing interruptions at the timings of switching between HD signals and SD signals.

The recording apparatus 1 shown in FIG. 9 differs from the recording apparatus 1 shown in FIG. 8 in that the reference-synchronization-signal generator 92 and the external output terminal 93 are omitted and in that an external input terminal 102 for receiving the reference synchronization signal supplied from the camera 4 is newly provided instead.

In the recording apparatus 1 shown in FIG. 9, the reference synchronization signal is supplied from the camera 4 to the external input terminal 102, and the external input terminal 102 receives the reference synchronization signal and supplies the reference synchronization signal to the operation-clock-signal generator 20. The reference synchronization signal has a predetermined frequency regardless of whether the SDI signals input to the recording apparatus 1 are HD signals or SD signals, similarly to the reference synchronization signal generated by the reference-synchronization-signal generator 92 described earlier.

Thus, also in the recording apparatus 1 shown in FIG. 9, the time taken for classifying the input SDI signals is substantially zero, and a reference synchronization signal having a predetermined frequency is constantly supplied to the operation-clock-signal generator 20. Accordingly, the operation-clock-signal generator 20 does not become unlocked at the timing of switching of the input SDI signals, so that recording on a disc recording medium is not interrupted even when the SDI signals are switched. That is, SDI signals can be recorded on a disc recording medium without causing interruptions at the timings of switching between HD signals and SD signals.

In the recording apparatuses 1 shown in FIGS. 7 to 9, similarly to the recording apparatus 1 shown in FIG. 1, the delayer 42 causes a delay for a predetermined time that it takes for the resolution converter 41 to upconvert SD signals into HD signals. Thus, the controller 22 can manage time information (time axis) in the recording apparatus 1 in an integrated manner, so that management (control) of time information is facilitated. Furthermore, when switching between HD signals and SD signals occur, since these two types of signals have the same phase, the switching can take place without disturbing even a single frame (or field) of image.

Next, an SDI-signal switching process executed by the recording apparatus 1 shown in FIG. 9 will be described with reference to FIG. 10 as an example of a recording process in which recording on a disc recording medium is not interrupted even when SDI signals are switched.

Figure 10:
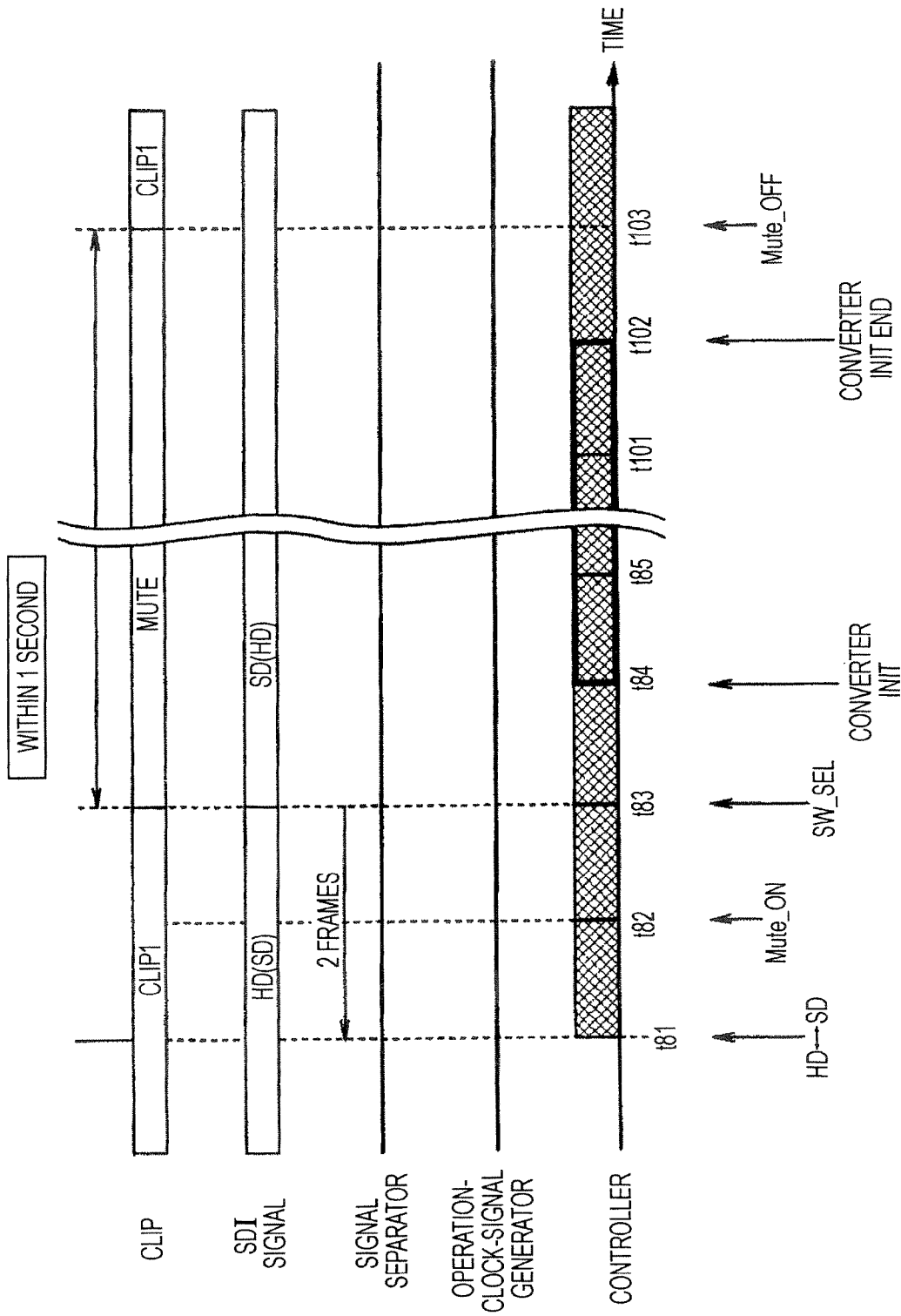
FIG. 10 is a timing chart for explaining processing executed by individual blocks of the recording apparatus shown in FIG. 9.

FIG. 10 is a timing chart for explaining processing executed by individual blocks of the recording apparatus 1 shown in FIG. 9, corresponding to the timing chart shown in FIG. 3.

In FIG. 9, it is assumed that HD signals being recorded as "Clip 1" on a disc recording medium are switched to SD signals at time $t_{83}$. In this case, a signal indicating input of SD signals (signal indicating SD signals) is supplied from the camera 4 to the controller 22 via the external input terminal 101 at a time preceding time $t_{83}$ by a predetermined time, e.g., at time $t_{81}$ preceding by a time taken for processing of two frames.

Upon receiving the signal indicating input of SD signals at time $t_{81}$, at time $t_{82}$, the controller 22 controls the signal processor 18 to turn on the muting function of the muting circuit 51. Then, at time $t_{83}$, the controller 22 sets the switches 15 and 17 to the terminals on the sides associated with SD signals. That is, the controller 22 causes the switch 15 to select the terminal 15b and causes the switch 17 to select the terminal 17a.

At time $t_{84}$, the controller 22 supplies an initializing instruction to the converter 16. In response to the instruction, the converter 16 starts initialization at time $t_{84}$ and finishes initialization at time $t_{102}$.

After the initialization by the converter 16 is finished, at time $t_{103}$, the controller 22 turns off the muting function of the signal processor 18. Thus, converted HD signals obtained by upconverting SD signals are recorded on the disc recording medium as "Clip 1" together with the HD signals input up to time $t_{81}$.

In the case of the recording apparatus 1 shown in FIG. 1, as described with reference to FIG. 3, when input SDI signals are switched from HD signals to SD signals, a reference synchronization signal extracted therefrom becomes unstable, so that operation clock signals generated by the operation-clock-signal generator 20 also become unstable. Thus, on the basis of unlocked-status information supplied from the operation-clock-signal generator 20, the controller 22 suspends (quits) recording of "Clip 1" on the disc recording medium. (This applies similarly to a case where input SDI signals are switched from SD signals to HD signals).

In contrast, in the case of the recording apparatus 1 shown in FIG. 9, the operation-clock-signal generator 20 generates operation clock signals on the basis of a reference synchronization signal supplied from the camera 4 via the external input terminal 102. As described earlier, the frequency of the reference synchronization signal is constant regardless of whether the SDI signals are HD signals or SD signals. Thus, the operation-clock-signal generator 20 does not become unlocked when the SDI signals are switched.

Therefore, since unlocked-status information is not supplied to the controller 22, recording of "Clip 1" on the disc recording medium is not quit, and only muting is carried out. Thus, after the muting function is turned off, converted HD signals obtained by upconverting SD signals can be recorded as the same "Clip 1" on the disc recording medium.

In the case of the recording apparatus 1 shown in FIG. 1, as described with reference to FIG. 3, the time taken before the reference synchronization signal and operation clock signals that are output become stable (locked) at the time of switching of SDI signals presents a bottleneck in resuming recording. In the case of the recording apparatus 1 shown in FIG. 1, since this time is not needed, it is possible to quickly resume recording of "Clip 1" on the disc recording medium. For example, the muting time of "Clip 1" can be within one second as shown in FIG. 10.

Figure 11:
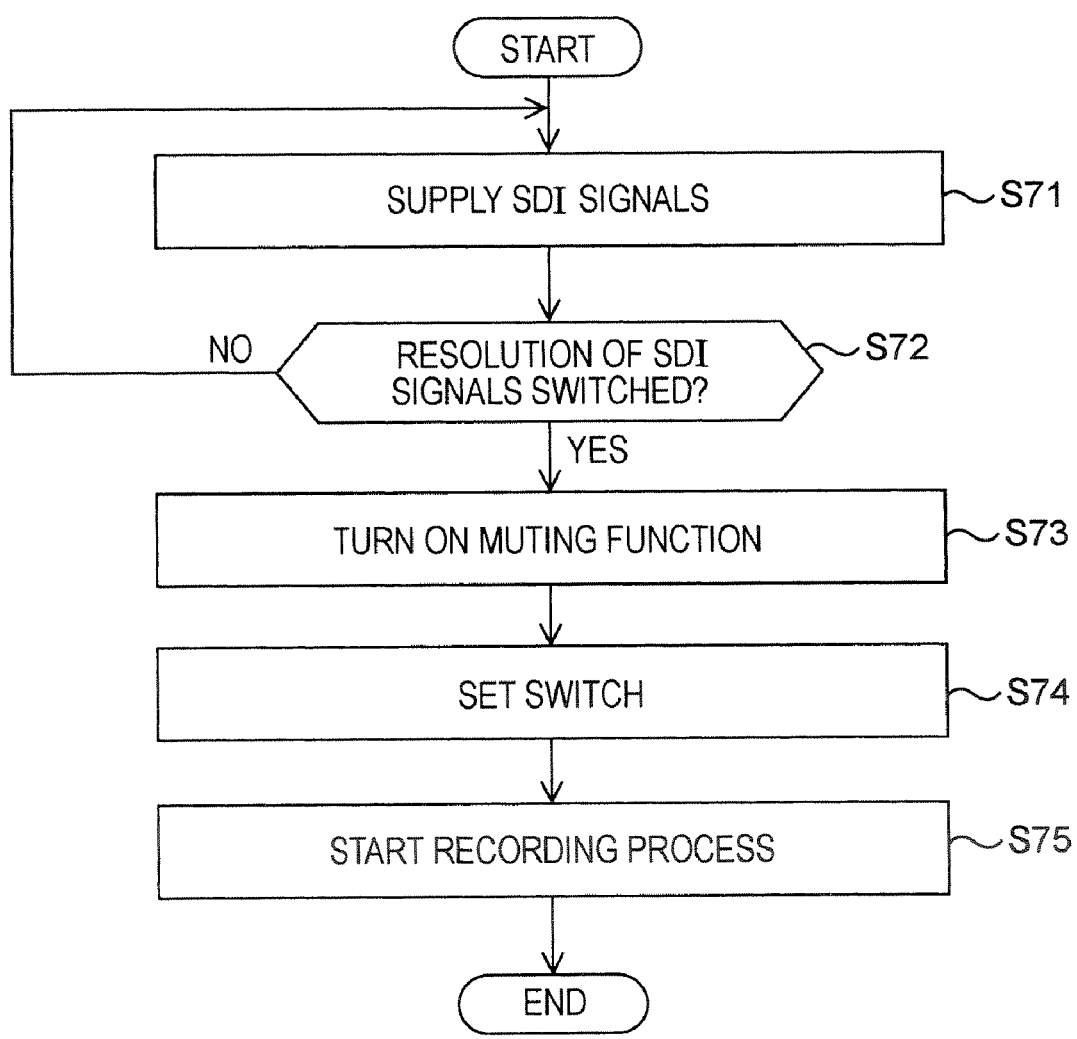
FIG. 11 is a flowchart of an SDI-signal switching process executed by the recording apparatus shown in FIG. 9.
Figure 12:
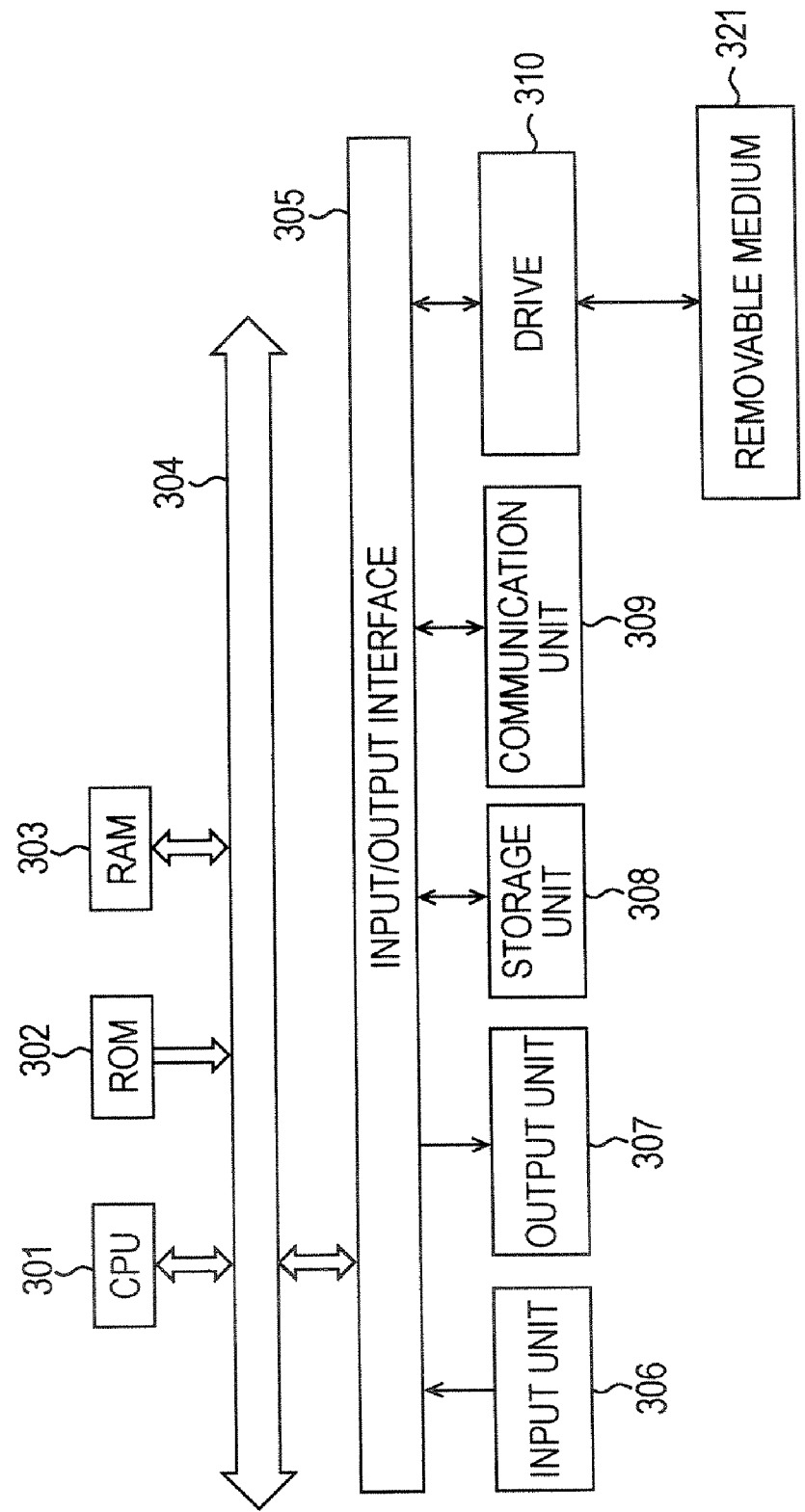
FIG. 12 is a block diagram showing the configuration of a computer according to an embodiment of the present invention.

Next, an SDI-signal switching process executed by the recording apparatus 1 shown in FIG. 9 with reference to a flowchart shown in FIG. 11.

First, in step S71, the external input terminal 100 receives SDI signals supplied from the camera 4 and supplies the SDI signals to the signal separator 14.

In step S72, the controller 22 checks whether the resolution of the input SDI signals has been switched on the basis of a signal supplied from the camera 4 via the external input terminal 101.

When it is determined in step S72 that the resolution of the SDI signals has not been switched, the process returns to step S71, and steps S71 and S72 are repeated. On the other hand, when it is determined in step S72 that the resolution of the SDI signals has been switched, the process proceeds to step S73.

In step S73, the controller 22 turns on the muting function of the muting circuit 51 and initializes the converter 16. Then, in step S74, the controller 22 sets the switches 15 and 17 in accordance with the resolution of the SDI signals after the switching. The process then proceeds to step S75.

In step S75, the controller 22 starts a process of recording the input SDI signals. More specifically, in step S75, the controller 22 turns off the muting function of the signal processor 18, supplies the SDI signals to the disc recorder 19, and causes the disc recorder 19 to start a recording process. The process is then exited.

As described above, with the recording apparatus 1 shown in FIG. 1, even when the resolution of input SDI signals is switched, the time of interruption of recording of the SDI signals can be reduced or even eliminated. Furthermore, the SDI signals can be recorded on a disc recording medium as a single clip (file) of HD signals. (This similarly applies to the recording apparatus 1 shown in FIG. 7 or FIG. 8).

Thus, a clip is not divided even when the resolution of SDI signals is switched. Accordingly, management of a clip is facilitated for a user who records an image captured by the camera 4.

Furthermore, similarly to the recording apparatus 1 shown in FIG. 7, when HD signals are input, the HD signals are delayed by a time corresponding to a time taken for upconversion by the converter 16. Thus, even when switching between SD signals and HD signals occurs, HD signals of a single clip can be recorded on a disc recording medium on the basis of the same temporal axis (time code).

Furthermore, according to the recording apparatus 1 shown in FIG. 8 or 9, a single external input terminal suffices for receiving (inputting) SDI signals. Thus, it is possible to reduce manufacturing cost by saving space (reducing the apparatus size) and reducing the number of parts. Furthermore, since HD signals and SD signals can be supplied to the recording apparatus 1 via a single cable, the ease of operation is improved particularly when, for example, connecting the recording apparatus 1 with the camera 4 at a remote location using a long cable.

The controller 22 may supply information (metadata) indicating whether SDI signals being supplied from the signal processor 18 to the disc recorder 19 are SDI signals input as HD signals (HD signals) or SDI signals input as SD signals and upconverted into HD signals by the recording apparatus 1 (converted HD signals) to the disc recorder 19 and record the information together with the SDI signals, so that it is possible to recognize the distinction when the SDI signals are read from the disc recording medium.

In order to achieve the above, for example, information regarding points of change from HD signals to converted HD signals or points of change from converted HD signals to HD signals is recorded in a metadata area (non-real-time area) for recording data that is read independently from SDI signals such as frame image data that are read in real time from the disc recording medium. In this case, for example, it is possible to search for a point of switching of the resolution of SDI signals. For example, when the camera 4 is an endoscope camera, it is possible to start playback at a point where a lens is replaced.

Alternatively, for example, information indicating whether a frame image is an image with a converted resolution is recorded in a metadata area for recording data that is read in real time together with the frame image data from the disc recording medium (real-time metadata area). In this case, for example, it is possible to display information indicating whether the image has been recorded at a converted resolution on a screen of a display where an image read from the disc recording medium is displayed.

Although the recording apparatus 1 uses a disc-shaped recording medium (disc recording medium) for recording in the examples described above, without limitation to a disc recording medium, for example, a semiconductor memory may be used.

The series of processes described above can be executed by hardware or software. When the series of processes are executed by software, programs constituting the software are installed from a program recording medium onto a computer embedded in special hardware or onto a general-purpose personal computer or the like that is capable of executing various functions with various programs installed thereon.

FIG. 11 is a block diagram showing an example of the configuration of a personal computer that executes the processes described above according to programs. A central processing unit (CPU) 301 executes various processes according to programs stored in a read-only memory (ROM) 302 or a storage unit 308. A random access memory (RAM) 303 stores programs executed by the CPU 301, relevant data, etc. as needed. The CPU 301, the ROM 302, and the RAM 303 are connected to each other via a bus 304.

The CPU 301 is also connected to an input/output interface 305 via the bus 304. The input/output interface 305 is connected to an input unit 306 including a keyboard, a mouse, a microphone, etc., and to an output unit 307 including a display such as a cathode ray tube (CRT) display or a liquid crystal display (LCD), a speaker, etc. The CPU 301 executes various processes according to instructions input from the input unit 306. The CPU 301 then outputs results of the processes to the output unit 307.

The storage unit 308 connected to the input/output interface 305 is formed of, for example, a hard disc, and it stores programs executed by the CPU 301 and various relevant data. A communication unit 309 carries out communication with external devices that are connected directly or via networks such as the Internet or local area networks.

The communication unit 309 may carry out communications by wire or by wireless, or may be capable of carrying out both wired and wireless communications. The communication protocol that is used is not particularly limited. For example, in the case of wireless communications, various wireless communication protocols may be used, such as wireless local area network (LAN) based on IEEE (The Institute of Electrical and Electronic Engineers) 802.11a, 802.11b, or 802.11g, or Bluetooth. Similarly, in the case of wired communications, various wired communication protocols may be used, such as IEEE 1394, Ethernet®, or USB (Universal Serial Bus).

Furthermore, a drive 310 is connected to the input/output interface 305. When a removable medium 321, such as a magnetic disc, an optical disc, a magneto-optical disc, or a semiconductor memory, is mounted on the drive 310, the drive 310 drives the removable medium 321 to obtain programs, data, etc. recorded thereon. The programs, data, etc. that have been obtained are transferred to and stored in the storage unit 308 as needed. Programs and data may also be obtained via the communication unit 309 and stored in the storage unit 308.

It is to be understood that steps defining the programs stored on the program storage medium may include processes that are executed in parallel or individually, as well as processes that are executed in the orders described in this specification.

Although the embodiments are described in the context of SDI signals as examples, the present invention can be applied to transmission methods that support video signals having different resolutions, without limitation to the SDI standard.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
   a synchronization-signal generator configured to generate a predetermined synchronization signal on a basis of a reference synchronization signal, determine whether the predetermined synchronization signal is stable, and generate a locked/unlocked status based on a result of the determination;
   a resolution converter configured to convert a second signal having a second resolution into a third signal having a first resolution higher than the second resolution when a received signal is the second signal, the second signal being different from a first signal having a first resolution;
   a delayer configured to delay the first signal received when the received signal is the first signal, by a predetermined time that is taken to convert the second signal into the third signal having the first resolution;
   a muting circuit configured to discard the first signal delayed by the delayer or the third signal when the locked/unlocked status indicates that the predetermined synchronization signal is not stable; and
   a recorder configured to record the first signal having the first resolution and delayed by the delayer or the third signal on a recording medium on a basis of the predetermined synchronization signal when the locked/unlocked status indicates that the predetermined synchronization signal is stable.

2. The recording apparatus according to claim 1, further comprising:
   a video-signal receiver configured to receive the first signal or the second signal;
   a control-signal receiver configured to receive a control signal indicating whether the first signal or the second signal is received by the video-signal receiver; and
   a reference-synchronization-signal receiver configured to receive the reference synchronization signal.

3. The recording apparatus according to claim 2,
   wherein the video-signal receiver receives the first signal and the second signal continuously, and
   wherein the recorder records the first signal and the third signal as a single file on the recording medium.

4. The recording apparatus according to claim 3,
   wherein when the third signal is recorded on the recording medium, the recorder also records information indicating that the third signal has a converted resolution on the recording medium.

5. The recording apparatus according to claim 3,
   wherein the recorder also records information regarding a point of change from the first signal to the third signal or a point of change from the third signal to the first signal on the recording medium.

6. A recording method comprising the steps of:
   generating a predetermined synchronization signal on a basis of a reference synchronization signal;
   determining whether the predetermined synchronization signal is stable;
   generating a locked/unlocked status based on a result of the determining;
   converting a second signal having a second resolution into a third signal having a first resolution higher than the second resolution when a received signal is the second signal, the second signal being different from a first signal having a first resolution;
   delaying the first signal when the received signal is the first signal, by a predetermined time that is taken to convert the second signal into the third signal having the first resolution;
   discarding the delayed first signal or the third signal when the locked/unlocked status indicates that the predetermined synchronization signal is not stable; and
   recording the delayed first signal having the first resolution or the third signal on a recording medium on a basis of the predetermined synchronization signal when the locked/unlocked status indicates that the predetermined synchronization signal is stable.

7. A non-transitory computer-readable medium including a program that, when executed on a computer, causes the computer to perform a method comprising:
   generating a predetermined synchronization signal on a basis of a reference synchronization signal;
   determining whether the predetermined synchronization signal is stable;
   generating a locked/unlocked status based on a result of the determining;
   converting a second signal having a second resolution into a third signal having a first resolution higher than the second resolution when a received signal is the second signal, the second signal being different from a first signal having a first resolution;
   delaying the first signal when the received signal is the first signal, by a predetermined time that is taken to convert the second signal into the third signal having the first resolution;
   discarding the delayed first signal or the third signal when the locked/unlocked status indicates that the predetermined synchronization signal is not stable; and
   recording the delayed first signal or the third signal on a recording medium on a basis of the predetermined synchronization signal when the locked/unlocked status indicates that the predetermined synchronization signal is stable.

* * * * *